(12) United States Patent
He et al.

(10) Patent No.: US 10,989,587 B2
(45) Date of Patent: Apr. 27, 2021

(54) DISTRIBUTED FIBRE SENSING SYSTEM AND VIBRATION DETECTION AND POSITIONING METHOD THEREFOR

(71) Applicants: SHANGHAI JIAOTONG UNIVERSITY, Shanghai (CN); NEUBREX CO., LTD., Hyogo (JP)

(72) Inventors: Zuyuan He, Shanghai (CN); Qingwen Liu, Shanghai (CN); Dian Chen, Shanghai (CN); Xinyu Fan, Shanghai (CN)

(73) Assignees: SHANGHAI JIAOTONG UNIVERSITY, Shanghai (CN); NEUBREX CO., LTD., Hyogo (JP)

( * ) Notice: Subject to any disclaimer, the term of this patent is extended or adjusted under 35 U.S.C. 154(b) by 142 days.

(21) Appl. No.: 16/322,259

(22) PCT Filed: Aug. 26, 2016

(86) PCT No.: PCT/CN2016/096807
§ 371 (c)(1),
(2) Date: Jan. 31, 2019

(87) PCT Pub. No.: WO2018/035833
PCT Pub. Date: Mar. 1, 2018

(65) Prior Publication Data
US 2020/0182685 A1 Jun. 11, 2020

(30) Foreign Application Priority Data
Aug. 25, 2016 (CN) .......................... 201610719172.3

(51) Int. Cl.
*G01H 9/00* (2006.01)
*G01D 5/353* (2006.01)

(52) U.S. Cl.
CPC ......... *G01H 9/004* (2013.01); *G01D 5/35358* (2013.01)

(58) Field of Classification Search
CPC .... G01H 9/004; G01H 9/006; G01D 5/35358; G01D 5/35361; G01D 5/35306; G01D 5/35335; H04B 10/071
See application file for complete search history.

(56) References Cited

U.S. PATENT DOCUMENTS

| 2009/0103100 A1* | 4/2009 | Froggatt | G01M 11/083 356/477 |
| 2012/0067118 A1* | 3/2012 | Hartog | G01D 5/35361 73/152.16 |

(Continued)

FOREIGN PATENT DOCUMENTS

| CN | 102628698 | 8/2012 |
| CN | 105067103 | 11/2015 |

(Continued)

OTHER PUBLICATIONS

Liu et al. ("Distributed Fiber Optic Sensors for Vibration Detection", Published Jul. 26, 2016, MDPI Sensors, 2016, 16, 1164) (Year: 2016).*

(Continued)

*Primary Examiner* — Jennifer D Bennett
(74) *Attorney, Agent, or Firm* — Wenderoth, Lind & Ponack, L.L.P.

(57) ABSTRACT

A distributed fibre sensing system and a vibration detection and positioning method therefor are disclosed. The system comprises: a signal generating module, a light source module, an optical frequency comb generating module, a frequency sweeping and pulse generating module, an optical circulator, a sensing fibre, an interference module, a photoelectric conversion module and a detection and position module. The method comprises: obtaining a plurality of (Continued)

Rayleigh backscattering signals of the sensing fibre; performing a fading elimination processing on the Rayleigh backscattering signals, thereby obtaining a plurality of averaged Rayleigh backscattering signals of non-interference fading and polarization fading; performing a phase processing on the averaged Rayleigh backscattering signals, thereby obtaining phase variance curves; and determining a vibration point according to variances in the phase variance curves, and finally obtaining a position and a vibration waveform of the vibration point.

11 Claims, 3 Drawing Sheets

(56) References Cited

U.S. PATENT DOCUMENTS

| 2014/0176937 | A1 | 6/2014 | Liu et al. |
| 2016/0231197 | A1* | 8/2016 | Baker ............... G01M 11/3172 |
| 2016/0275788 | A1* | 9/2016 | Wu ........................ G08G 1/02 |
| 2017/0138785 | A1 | 5/2017 | Tadakuma |

FOREIGN PATENT DOCUMENTS

| CN | 105490738 | | 4/2016 |
| CN | 105490738 A | * | 4/2016 |
| JP | 2016-085142 | | 5/2016 |
| WO | 2016/021689 | | 2/2016 |

OTHER PUBLICATIONS

International Search Report dated May 24, 2017 in International (PCT) Application No. PCT/CN2016/096807.
Notice of Reasons for Refusal dated Dec. 18, 2019 in corresponding Japanese Patent Application No. 2019-506366, with English Translation.
Zhu et al., "Active Compensation Method for Light Source Frequency Drifting in Φ-OTDR Sensing System", IEEE Photonics Technology Letters, 2015, vol. 27, No. 24, pp. 2523-2526.
Yang et al., "Long-Range Distributed Vibration Sensing Based on Phase Extraction From Phase-Sensitive OTDR", IEEE Photonics Journal, 2016, vol. 8, No. 3, 13 pages.
Von der Weid et al., "On the Characterization of Optical Fiber Network Components with Optical Frequency Domain Reflectometry", Journal of Lightwave Technology, vol. 15, No. 7, pp. 1131-1141.
Extended European Search Report dated Feb. 19, 2020 in corresponding European Patent Application No. 16913855.9.

\* cited by examiner

DISTRIBUTED FIBRE SENSING SYSTEM AND VIBRATION DETECTION AND POSITIONING METHOD THEREFOR

TECHNICAL FIELD

The present invention relates to a technology in the field of fibre sensing, in particular, to a distributed fibre sensing system and a vibration detection find positioning method therefor.

BACKGROUND ART

Since the invention of optical fibre in the 1970s, the fibre sensing technology has also been booming. In addition to being used for long-range high-speed communications, the fibre also has an ability to sense external physical parameters. By means of this sensitive characteristic, researchers invented a series of fibre sensing devices among which the distributed fibre vibration sensor has been a research hotspot in recent years. Compared with traditional vibration sensors, the distributed fibre vibration sensor has many advantages, such as water and moisture resistance, anti-electromagnetic interference and use safety, and most importantly, has distributed sensing and long-distance sensing capabilities.

At present, the most widely used and most studied is a distributed fibre sensing system based on an optical time-domain reflectometer because of its advantages, such as compact structure, simple demodulation algorithm, high positioning accuracy and high signal-to-noise ratio. However, there are two major defects: first, the vibration frequency response bandwidth and the sensing distance of the system are contradictory. Because the frequency response bandwidth of the traditional distributed fibre vibration sensing system based on the optical time-domain reflectometer is hall of the frequency for transmitting probe pulses of die system, and the reciprocal of the frequency for transmitting probe pulses, i.e., the transmission time interval of probe pulses, must be greater than the round trip time of light in the entire sensing fibre. Therefore the longer the sensing fibre is, the smaller the vibration response bandwidth is, and vice versa. This defect severely limits the application of such distributed fibre vibration sensing system in the field of high-frequency vibration sensing. Secondly, the spatial resolution and the maximum detection distance of the system are contradictor. To achieve a high spatial resolution, the duration of optical probe pulse must be very short, which results in a very low power of the optical probe pulse, and in turn limits the detection range.

With respect to the contradiction between the vibration frequency response bandwidth and the sensing distance, there are currently several solutions as follows: a distributed fibre vibration sensing system based or an optical frequency-domain reflectometer, which can obtain frequency information of high frequency vibration, but cannot obtain time domain information of the vibration; a distributed fibre sensing system based on an interferometer, which can obtain a very large range of vibration frequency response, but has disadvantages of complicated demodulation algorithm and poor positioning accuracy; a distributed fibre sensing system based on a fusion structure of an interferometer and an optical time-domain reflectometer, which has obtained advantages of the two kinds of systems described above, but becomes complicated and requires the sensing fibre to be of a ring structure, resulting in a failure of single-end measurement; and a distributed sensing system based on a frequency-division multiplexing technology and an optical time-domain reflectometer, whose overall performances, such as spatial resolution, measurable range and signal-to-noise ratio, still need to be improved.

SUMMARY OF THE INVENTION

With respect to the prior art that the transmission frequency of probe pulses is mostly limited by the sensing distance, and that the detection algorithm based on intensity-based demodulation has a relatively low signal-to-noise ratio, is incapable of eliminating polarization fading noise and interference fading noise and is prone to make vibration waveform information obtained from phase demodulation wrong, the present invention provides a distributed fibre sensing system and a vibration detection and positioning method therefor, which eliminates very weak reflection points on the Rayleigh backscattering signals of sensing fibre and improve the signal-to-noise ratio and the positioning precision by generating optical frequency comb signals and combining a phase demodulation algorithm that can eliminate interference fading and polarization fading; and which multiply expand the vibration frequency response bandwidth by means of a frequency-division multiplexing technology, and then solves the contradiction between the spatial resolution and the detection distance by the swept-frequency optical pulse.

The present invention is implemented by means of the following technical solution.

The present invention relates to a distributed fibre sensing system, which comprises a signal generating module, a light source module, an optical frequency comb generating module, a frequency sweeping and pulse generating module, an optical circulator, a sensing fibre, an interference module, a photoelectric conversion module and a detection and position module, wherein: the signal generating module inputs an amplified swept radio frequency pulse sequence and an amplified single-frequency sinusoidal wave signal to the frequency sweeping and pulse generating module and the optical frequency comb generating module respectively, and the signal generating module sends a trigger signal to the detection and position module at the same time; an ultra-narrow-linewidth laser generated by the light source module is split into a detection light path and a reference light path which are then output to the optical frequency comb generating module and the interference module, respectively; the optical frequency comb generating module inputs an optical frequency comb signal to the frequency sweeping and pulse generating module, and the frequency sweeping and pulse generating module outputs an amplified swept-frequency optical probe pulse string which is then input into the sensing fibre through the optical circulator; a Rayleigh backscattering light generated by the sensing fibre is input to the interference module through the optical circulator and mixed with a reference light at the interference module to generate a mixed optical signal, and the mixed optical signal is input into the photoelectric conversion module; the photoelectric conversion module converts the mixed optical signal into an electric signal, and inputs the electric signal to the detection and position module for detection and positioning of a vibration point.

The signal generating module comprises: an arbitrary signal generator and two radio frequency signal amplifiers, the two radio frequency signal amplifiers are connected to two output channels of the arbitrary signal generator respectively.

One channel of the arbitrary signal generator repeatedly outputs a swept radio frequency pulse sequence, and the other channel outputs a single-frequency sinusoidal wave signal.

The swept radio frequency pulse sequence comprises: a plurality of swept radio frequency pulse signals with equal time interval, same pulse width, and different and non-overlapped sweeping ranges.

The product of the time interval and the number of swept radio frequency pulse signals is equal to the round trip time of light in the sensing fibre.

The light source module comprises: a narrow-line width fibre laser device, a fibre coupler and a polarization controller which are connected in sequence.

Preferably, the fiber coupler has a split ratio of 90:10.

The optical frequency comb generating module comprises a DC voltage source and an optical modulator, the DC voltage source adjusts a DC bias voltage input into the optical modulator and generates the optical frequency comb signal.

The optical modulator is an optical intensity modulator or an optical phase modulator.

The frequency sweeping and pulse generating module comprises an acousto-optic modulator/single-sideband modulator and an erbium-doped fiber amplifier which are connected to each other.

The sensing fibre is a single-mode communication fibre.

The interference module is a 50:50 fibre coupler.

The photoelectric conversion module is a balanced detector.

The detection and position module comprises a data acquisition card and a positioning unit which are connected to each other the data acquisition card samples the input electric signal, and inputs original data into the positioning unit for phase demodulation.

The present invention relates to a vibration detection positioning method based on the above-mentioned system, which comprises the steps of: performing digital filtering on original data segments generated from a plurality of swept-frequency optical probe pulses by a plurality of digital band-pass filters with different frequency bands without any overlapping, thereby obtaining a plurality of Rayleigh backscattering signals of the sensing fibre; then performing a fading elimination processing on the Rayleigh backscattering signals, thereby obtaining a plurality of averaged Rayleigh backscattering signals of non-interference fading and polarization fading; performing a phase processing on the averaged Rayleigh backscattering signals, thereby obtaining phase variance curves; and determining a vibration point according to variances in the phase variance curves, and finally obtaining a position and a vibration waveform of the vibration point.

The Rayleigh backscattering signals are obtained by the following method: generating a plurality of digital band-pass filters with different frequency bands without any overlapping by the positioning unit; dividing the original data segments from the plurality of swept-frequency optical probe pulses into sub-data segments, the number of which is equal to that of the digital band-pass filters; and then performing a cross-correlation operation on the sub-data segments and the corresponding digital matched filters; thereby obtaining a set of Rayleigh backscattering signals of the sensing fibre.

The fading elimination processing includes: taking the conjugate of one Rayleigh backscattering signal as a reference value, multiplying the other Rayleigh backscattering signals with the reference value, thereby obtaining a set of Rayleigh backscattering signals whose phases close to zero; and averaging the Rayleigh backscattering signals whose phases close to zero, thereby obtaining averaged Rayleigh backscattering signals without interference fading and polarization fading.

The phase processing includes: taking the phase term of each averaged Rayleigh backscattering signal as a phase curve; delaying the phase curve, making the difference between the phase curves before and after the time shift to obtain a differential phase curve; and finding the variance of the differential phase curve, thereby obtaining a phase variance curve.

The determination of the vibration point includes setting a point on the phase variance curve as the vibration point, the set point having a variance on the phase variance curve greater than 0.02.

The position of the vibration point on the sensing fibre is $$z = \frac{c' k_0 t_s}{2},$$

$c'$ is a propagation speed of light in the fibre $t_s$ is a sampling rate of the data acquisition card, and $k_0$ is an index value corresponding to the vibration point.

The vibration point has a vibration waveform which is a new sequence composed of differential phases at the vibration point in the differential phase curve.

Technical Effects

Compared with the prior art, the present invention can obtain a high spatial resolution and a long detection distance at the same time, can multiply expand a vibration frequency response bandwidth, can eliminate very weak reflection points on the Rayleigh backscattering signals to further eliminate phase demodulation errors; and can achieve the purposes of increasing the signal-to-noise ratio, and accurately detecting and positioning the vibration point.

Figure 1:
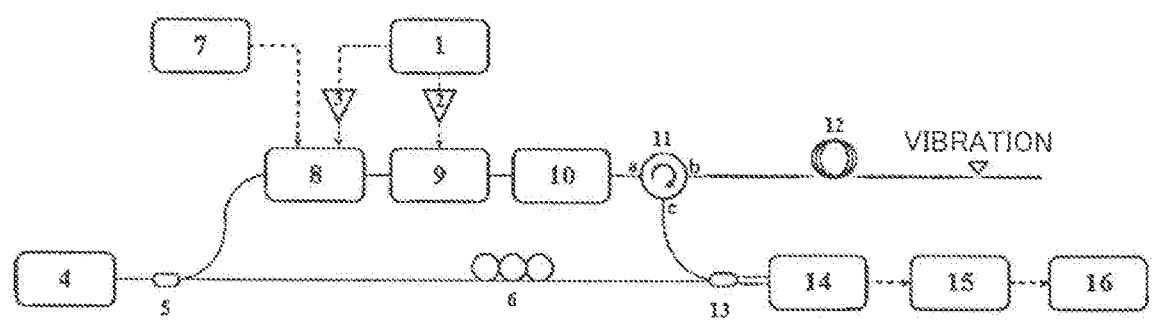
FIG. 1 is a schematic diagram of a distributed fibre sensing system.

In the figures, reference numeral 1 represents an arbitrary signal generator; reference numerals 2 and 3 represent radio-frequency signal amplifiers; reference numeral 4 represents a narrow-linewidth fibre laser device; reference numeral 5 represents a fibre coupler; reference numeral 6 represents a polarization controller; reference numeral 7 represents a DC voltage source; reference numeral 8 represents an optical modulator; reference numeral 9 represents an acousto-optical modulator; reference numeral 10 represents an erbium-doped fibre amplifier; reference numeral 11 represents an optical circulator; reference numeral 12 represents a sensing fibre; reference numeral 13 represents a 50:50 fibre coupler; reference numeral 14 represents a balanced detector; reference numeral 15 represents a data acquisition card; and reference numeral 16 represents a positioning unit.

DESCRIPTION OF EMBODIMENTS

The embodiment of the present invention will be described below in detail. The embodiment is implemented on the basis of the technical solution of the present invention, and provides a detailed implementation method and a specific operation process, but the protection scope of the present invention is not limited to the embodiment described below.

Embodiment 1

As shown in FIG. 1, the present embodiment comprises: a signal generating module, a light source module, an optical frequency comb generating module, a frequency sweeping and pulse generating module, an optical circulator 11, a sensing fibre 12, an interference module, a photoelectric conversion module and a detection and position module, wherein: the signal generating module inputs an amplified swept radio frequency pulse sequence and an amplified single-frequency sinusoidal wave signal to the frequency sweeping and pulse generating module and the optical frequency comb generating module respectively, and the signal generating module sends a trigger signal to the detection and position module at the same time; an ultra-narrow-linewidth laser generated by the light source module is split into a detection light path and a reference light path which are then output to the optical frequency comb generating module and the interference module, respectively; the optical frequency comb generating module inputs an optical frequency comb signal to the frequency sweeping and pulse generating module, and the frequency sweeping and pulse generating module outputs an amplified swept-frequency optical probe pulse string which is then input via a port a of the optical circulator 11 and output to the sensing fibre 12 via a port b; a Rayleigh backscattering light generated by the sensing fibre 12 is input to the optical circulator 11 via the port b of the optical circulator 11 and input to the interference module via a port c and mixed with a reference light at the interference module to generate a mixed optical signal, and the mixed optical signal is input into the photoelectric conversion module; the photoelectric conversion module converts the mixed optical signal into an electric signal, and inputs the electric signal to the detection and position module for detection and positioning of a vibration point.

The signal generating module comprises: an arbitrary signal generator 1 and two radio frequency signal amplifiers 2, 3, the two radio frequency signal amplifiers 2, 3 are connected to two output channels of the arbitrary signal generator 1 respectively.

One channel of the arbitrary signal generator 1 repeatedly outputs a swept radio frequency pulse sequence, and the other channel outputs a single-frequency sinusoidal wave signal.

The swept radio frequency pulse sequence repeatedly output includes repeat frequencies L=16, N=5 swept radio frequency pulse signals with equal time intervals T (20 μs), same pulse width $\tau_p$(2 μs), different and non-overlapped sweeping ranges: 150 to 170 MHz, 170 to 190 MHz, 190 to 210 MHz, 210 to 230 MHz, and 230 to 250 MHz.

The product NT of the time interval T and the number N of swept radio frequency pulse signals is equal to the round trip time of light in the sensing fibre 12, i.e., 100 μs.

The single-frequency sinusoidal wave signal has a frequency of 100 MHz.

The light source module comprises: a narrow-linewidth fibre laser device 4, a fibre coupler 5, and a polarization controller 6 which are connected in sequence.

The fiber coupler 5 has a split ratio of 90:10.

The narrow-linewidth fibre laser device 4 has a line width of 1 kHz.

The optical frequency comb generating module comprises a DC voltage source 7 and an optical modulator 8, the DC voltage source 7 adjusts a DC bias voltage input into the optical modulator 8 and generates the optical frequency comb signal.

The optical frequency comb signal is an optical frequency comb signal of detection light input to the optical modulator 8 and 2M+1=3 optical frequency components generated by the single-frequency sinusoidal wave signal, wherein M is the order of sideband generated by the optical modulator 8.

The optical modulator 8 is an optical intensity modulator.

The frequency sweeping and pulse generating module comprises an acousto-optic modulator 9 and an erbium-doped fibre amplifier 10 connected to each other.

Figure 2:
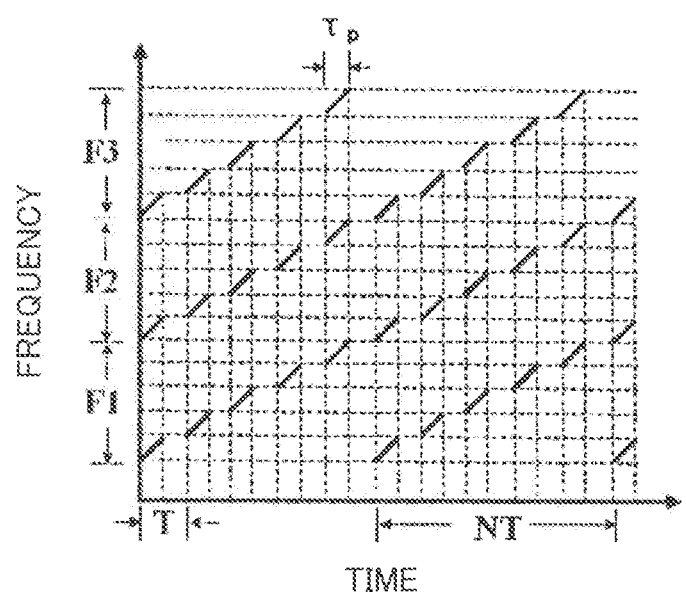
FIG. 2 is a time-frequency curve of a swept-frequency optical probe pulse signal.

As shown in FIG. 2, the swept optical probe pulse string output by the frequency sweeping and pulse generating module has a time interval T of 20 μs, a pulse width $\tau_p$ of 2 μs, and sweeping ranges: F1 of 50 to 70 MHz, 70 to 90 MHz, 90 to 110 MHz, 110 to 130 MHz and 130 to 150 MHz; F2 of 150 to 170 MHz, 170 to 190 MHz, 190 to 210 MHz, 210 to 230 MHz and 230 to 250 MHz; and F3 of 250 to 270 MHz, 270 to 290 MHz, 290 to 310 MHz, 310 to 330 MHz, and 330 to 350 MHz.

The sensing fibre 12 is a single-mode communication fibre and has a total length of 10 km.

The interference module is a 50:50 fibre coupler 13.

The photoelectric conversion module is a balanced detector 14.

The balanced detector 14 has a bandwidth of 400 MHz.

The detection and position module comprises a data acquisition card 15 and a positioning unit 16 which are connected to each other, the data acquisition card 15 samples the input electric signal, and inputs original data into the positioning unit 16 for phase demodulation.

The data acquisition card 15 has a sampling rate $\tau_s$ of 1 GSa/s and a resolution of 8 bits.

The present embodiment relates to a detection and positioning method based on the above-mentioned system, which comprises the following steps.

Step 1, the positioning unit 16 labels original data segments from the NL swept-frequency optical probe pulses sampled by the data acquisition card 15 in time sequence, i.e., $\{x_n(k); k=1, \ldots, K\}$; $n=1, \ldots, NL$, wherein K is the data volume of original data from one swept-frequency optical probe pulse; and generates 2M+1 digital band-pass filters with different frequency bands without overlapping $\{h_{n,m}(k); k=1, \ldots, K\}$; $n=1, \ldots, NL$; $m=1, \ldots, 2M+1$; the labeled original data segments are divided into 2M+1 sub-data segments and then labeled again, i.e., $\{x_{n,m}(k); k=1, \ldots, K\}$; $n=1, \ldots, NL$; $m=1, \ldots, 2M+1$.

Step 2, the NL(2M+1) sub-data segments obtained in Step 1 and the respective corresponding digital matched filters $\{h_{n,m}(k); k=1, \ldots, K\}$; $n=1, \ldots, NL$; $m=1, \ldots, 2M+1$ are subject to cross-correlation operation to obtain NL(2M+1) Rayleigh backscattering signals of the sensing fibre 12.

The expression of the Rayleigh backscattering signals is $$\left\{ R_{n,m}(k) = \sum_\kappa x_{n,m}(\kappa) h^*_{n,m}(\kappa + k); k = 1, \ldots, K \right\}; n = 1, \ldots, NL;$$

m=1, . . . , 2M+1, wherein κ is an index symbol, * indicates conjugate, and each resulting reflectivity is a complex number.

There are interference fading and polarization fading on the Rayleigh backscattering signals.

Since the time interval T between two adjacent optical probe pulses is much smaller than NT, i.e., smaller than the round trip time of light in the sensing fibre 12, the Rayleigh backscattering light of two adjacent optical probe pulses coincides in a period of time. However, because the frequencies of two adjacent optical probe pulses are different, and the corresponding matched filters are also different, a backscattering signal mismatched with the optical probe pulse can be suppressed by the band-pass filter and the matched filter to achieve the purpose of separating a backscattering light signal.

Step 3, the conjugate $\{R_{l,m}*(k); k=1, \ldots, K\}$; $m=1, \ldots, 2M+1$ of the Rayleigh backscattering signal $\{R_{l,m}(k); k=1, \ldots, K\}$; $m=1, \ldots, 2M+1$ from the swept-frequency optical probe pulse labeled 1 is taken as a reference value, and it is multiplied with the other Rayleigh backscattering signals to obtain NL(2M+1) Rayleigh backscattering signals whose phrases close to zero: $\{r_{n,m}(k)= R_{n,m}(k) \times R_{l,m}*(k); k=1, \ldots, K\}$; $n=1, \ldots, NL$; $m=1, \ldots, 2M+1$.

Step 4, the Rayleigh backscattering signals whose phases close to zero obtained in Step 3 are averaged to obtain NL averaged Rayleigh backscattering signals without interference fading and polarization fading:

$$\left\{r_n(k) = \sum_m r_{n,m}(k); k = 1, \ldots, K\right\}; n=1, \ldots, NL.$$

Step 5, the phase terms of the NL averaged Rayleigh backscattering signals obtained in Step 4 are taken to obtain NL phase curves: $\{\phi_n(k)=\text{angle}[r_n(k)]; k=1, \ldots, K\}$; $n=1, \ldots, NL$.

Step 3 to Step 5 are explained as follows: when n=1, for example, 2M+1 Rayleigh backscattering signals $\{R_{l,m}(k); k=1, \ldots, K\}$; $m=1, \ldots, 2M+1$ are demodulated from 2M+1 portions of Rayleigh backscattering light of the same swept-frequency optical probe pulse, and the 2M+1 Rayleigh backscattering signals have serious interference fading points and polarization fading points. The reflectivity of these fading points has a very small modulus, and affected by noise, the phase demodulation at these points can be erroneous. However, because the frequencies of the 2M+1 portions are different from each other, the 2M+1 Rayleigh backscattering signals are also different from each other, that is, the positions of the very weak points caused by interference fading and polarization fading on the 2M+1 Rayleigh backscattering signals are also different from each other. The averaging operation of the 2M+1 Rayleigh backscattering signals can eliminate these very weak points and thus eliminate the phase demodulation errors that occur at these points. However, since the reflectivity is a complex number, it can be known from the knowledge of the addition of complex numbers that the modulus of the addition result of the complex numbers is not always larger and sometimes becomes smaller. In order to maximize the modulus of the sum of reflectivity, it is necessary to rotate the reflectivity first, make their included angles close to zero, and then add them again.

Step 6, the NL phase curves obtained in Step 5 are delayed by D units, and the difference between the phase curves before and after the time shift is made to obtain NL differential phase curves: $\{\Delta\phi_n(k)=\phi_n(k)-\phi_n(k-D), k=1, \ldots, K\}$; $n=1, \ldots, NL$.

Step 7, the variance of the NL differential phase curves obtained in the Step 6 is found to obtain a phase variance curve thereof:

$$\left\{\sigma(k) = \frac{\sum_{n=1}^{NL}\left[\Delta\phi_n(k) - \frac{1}{NL}\sum_{n=1}^{NL}\Delta\phi_n(k)\right]^2}{NL}; k = 1, \cdots, K\right\}.$$

Step 8, when the variance at $k=k_0$ on the phase variance curve obtained in Step 7 is greater than 0.02, the point is the vibration point and the position of the vibration point on the sensing fibre 12 is $$z = \frac{c' k_0 t_s}{2},$$

wherein c' is a propagation speed of light in the fibre, $t_s$ is a sampling rate of the data acquisition card 15, and $k_0$ is an index value corresponding to the vibration point; the vibration point has a vibration waveform which is a new sequence $\{\Delta\phi_{k_0}(n); n=1, \ldots, NL\}$ composed of differential phases at k on the NL differential phase curves obtained in Step 6.

The spatial resolution $\Delta z$ of the present embodiment is determined by the sweeping range of the swept-frequency optical probe pulse, i.e., $$\Delta z = \frac{c'}{2\gamma \tau_p},$$

wherein $\gamma$ is a sweeping speed.

The vibration frequency response bandwidth of the present embodiment is determined by the transmission time interval of the swept-frequency optical probe pulses, i.e., ½T. Compared with the traditional solutions, theoretically, the vibration frequency response bandwidth is increased by times.

In the present embodiment, a vibration point was set. A single-frequency vibration with a frequency of 21 kHz occurred at 9.93 km of the sensing fiber 12, and the vibration coverage of the vibration point was 10 m.

In the present embodiment, K=100000, N=5, L=16, NL=80, M=1, and D=100. The bands of the three digital hand-pass filters had the bandwidths of 50 to 150 MHz, 150 to 250 MHz, and 250 to 350 MHz, respectively. Then the original data segments of the 80 swept-frequency optical probe pulses were labeled in time order as $\{x_n(k); k=1, \ldots, K\}$; $n=1, \ldots, 80$. The divided 80×3=240 sub-data segments were labeled as $\{x_{n,m}(k); k=1, \ldots, K\}$; $n=1, \ldots, 80$; $m=1, 2, 3$.

In the present embodiment, the obtained Rayleigh backscattering signals were $$\left\{R_{n,m}(k) = \sum_{\kappa=1}^{100000-k} x_{n,m}(\kappa) h_{n,m}^*(\kappa+k); k = 1, \ldots, 100000\right\};$$

$n=1, \ldots, 80$; $m=1, 2, 3$. The Rayleigh backscattering signals whose phrases close to zero were $\{r_{n,m}(k)=R_{n,m}(k) \times R_{l,m}*(k); k=1, \ldots, 100000\}$; $n=1, \ldots, 80$; $m=1, 2, 3$. The averaged Rayleigh backscattering signals were $$\left\{ r_n(k) = \sum_{m=1}^{3} r_{n,m}(k); k = 1, \ldots, 100000 \right\};$$

n=1, ..., 80. The phase curves were $\{\phi_n(k)=\text{angle}[r_n(k)]$; k=1, ..., K$\}$; n=1, ..., 80. The differential phase curves were $\{\Delta\phi_n(k)=\phi_n(k)-\phi_n(k-100)$; k=1, ..., 100000$\}$; n=1, ..., 80. The phase variance curves were $$\left\{ \sigma(k) = \frac{\sum_{n=1}^{80}\left[\Delta\phi_n(k) - \frac{1}{80}\sum_{n=1}^{80}\Delta\phi_n(k)\right]^2}{80}; k = 1, \ldots, 100000 \right\}.$$

In the phase variance curves, the variance at $k_0$=99300 was greater than 0.02, so it was determined that this point was the vibration point, and the position of the vibration point on the sensing fibre 12 was $$z_0 = \frac{k_0}{10} = 9930m,$$

which was coincident with the set vibration position.

Figure 3:
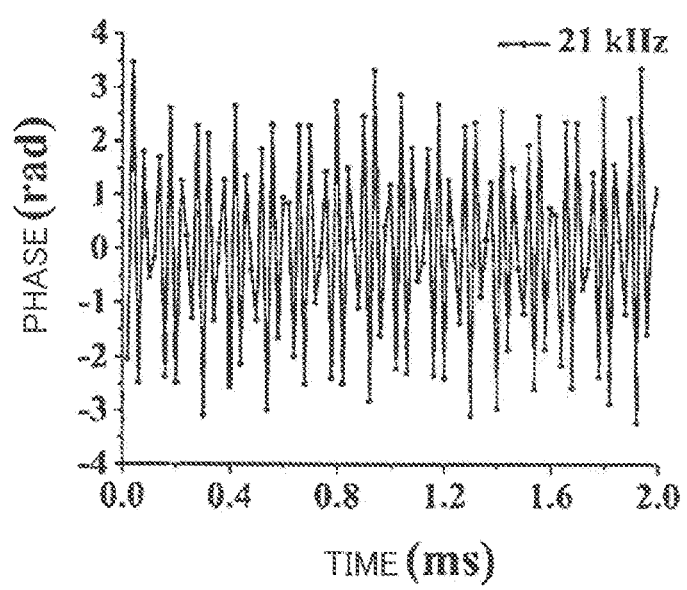
FIG. 3 is a vibration waveform diagram of a vibration point detected of Embodiment 1.

The vibration waveform of the vibration point was $\{\Delta\phi_{98,100}(n); n=1, \ldots, 80\}$. As shown in FIG. 3, the signal-to-noise ratio of the obtained vibration waveform reaches 25 dB.

The present embodiment breaks through the limitations of the length of the sensing fiber 12 on the vibration frequency response range. Since the sensor fibre 12 has a total length of 10 km, the maximum measurable vibration frequency is only 5 kHz in the traditional distributed fibre sensing system based on the optical, time-domain reflectometer. However, the vibration frequency of 21 kHz is successfully measured and the signal-to-noise ratio is high in the present embodiment

The invention claimed is:

1. A distributed fibre sensing system comprising:
   a signal generating module including (i) a signal generator configured to output a swept radio frequency pulse sequence and a single-frequency sinusoidal wave signal, (ii) a first radio frequency signal amplifier configured to amplify the swept radio frequency pulse sequence, and (iii) a second radio frequency signal amplifier configured to amplify the single-frequency sinusoidal wave signal;
   an optical frequency comb generating module connected to the second radio frequency signal amplifier to receive the amplified single-frequency sinusoidal wave signal;
   a frequency sweeping and pulse generating module connected to the first radio frequency signal amplifier to receive the amplified swept radio frequency pulse sequence;
   a light source module connected to the optical frequency comb generating module;
   an optical circulator;
   a sensing fibre;
   an interference module connected to the optical circulator;
   a photoelectric conversion module connected to the interference module; and
   a detection and position module connected to the photoelectric conversion module, wherein:
   an ultra-narrow-linewidth laser generated by the light source module is split into a detection light path and a reference light path which are then output to the optical frequency comb generating module and the interference module, respectively;
   the optical frequency comb generating module inputs an optical frequency comb signal to the frequency sweeping and pulse generating module, and the frequency sweeping and pulse generating module outputs an amplified swept-frequency optical probe pulse string which is then input into the sensing fibre through the optical circulator;
   a Rayleigh backscattering light generated by the sensing fibre is input to the interference module through the optical circulator and mixed with a reference light at the interference module to generate a mixed optical signal, and the mixed optical signal is input into the photoelectric conversion module;
   the photoelectric conversion module converts the mixed optical signal into an electric signal, and inputs the electric signal to the detection and position module for detection and positioning of a vibration point.

2. The distributed fibre sensing system according to claim 1, wherein:
   the first radio frequency signal amplifier and the second radio frequency signal amplifier are connected to two output channels of the signal generator respectively;
   one channel of the signal generator repeatedly outputs a swept radio frequency pulse sequence, and the other channel outputs a single-frequency sinusoidal wave signal, the swept radio frequency pulse sequence comprises: a plurality of swept radio frequency pulse signals with equal time interval, same pulse width, and different and non-overlapped sweeping ranges.

3. The distributed fibre sensing system according to claim 2, wherein
   the product of the time interval and the number of swept radio frequency pulse signals is equal to the round trip time of light in the sensing fibre.

4. The distributed fibre sensing system according to claim 1, wherein:
   the light source module comprises a narrow-linewidth fibre laser device, a fibre coupler and a polarization controller which are connected in sequence;
   the fibre coupler has a split ratio of 90:10.

5. The distributed fibre sensing system according to claim 1, wherein:
   the optical frequency comb generating module comprises a DC voltage source and an optical modulator;
   the DC voltage source adjusts a DC bias voltage input into the optical modulator and generates the optical frequency comb signal.

6. The distributed fibre sensing system according to claim 1, wherein
   the frequency sweeping and pulse generating module comprises an acousto-optic modulator or a single-sideband modulator and an erbium-doped fibre amplifier which are connected to each other.

7. A vibration detection and positioning method based on the system according to claim 1, comprising:
   generating a plurality of digital band-pass filters with different frequency bands without any overlapping by the detection and position module, and performing digital filtering on original data segments from a plurality of swept-frequency optical probe pulses, thereby obtaining a plurality of Rayleigh backscattering signals of the sensing fibre;

performing a fading elimination processing on the Rayleigh backscattering signals, thereby obtaining a plurality of averaged Rayleigh backscattering signals of non-interference fading and polarization fading;

performing a phase processing on the averaged Rayleigh backscattering signals, thereby obtaining phase variance curves; and determining a vibration point according to variances in the phase variance curves, and finally obtaining a position and a vibration waveform of the vibration point.

8. The vibration detection and positioning method according to claim 7, wherein
the Rayleigh backscattering signals are obtained by the following method:
generating the plurality of digital band-pass filters with different frequency bands without any overlapping by the detection and position module;
dividing the original data segments from the plurality of swept-frequency optical probe pulses into sub-data segments, the number of which is equal to that of the digital band-pass filters;
and then performing a cross-correlation operation on the sub-data segments and the corresponding digital matched filters, thereby obtaining a set of Rayleigh backscattering signals of the sensing fibre.

9. The vibration detection and positioning method according to claim 7, wherein
the fading elimination processing includes: taking a conjugate of one Rayleigh backscattering signal as a reference value, multiplying another of Rayleigh backscattering signals with the reference value, thereby obtaining a set of Rayleigh backscattering signals whose phases close to zero; and averaging the Rayleigh backscattering signals whose phases close to zero, thereby obtaining averaged Rayleigh backscattering signals without interference fading and polarization fading.

10. The vibration detection and positioning method according to claim 7, wherein
the phase processing includes: taking a phase term of each averaged Rayleigh backscattering signal as a phase curve; delaying the phase curve, making a difference between the phase curves before and after a time shift to obtain a differential phase curve; and finding the variance of the differential phase curve, thereby obtaining the phase variance curve.

11. The vibration detection and positioning method according to claim 7, wherein:
the determination of the vibration point includes setting a point on the phase variance curve as the vibration point, the set point having a variance on the phase variance curve greater than 0.02;
the position of the vibration point on the sensing fibre is $z=c'k_0 t_s/2$, $c'$ is a propagation speed of light in the sensing fibre, $t_s$ is a sampling rate of the detection and position module, and $k_0$ is an index value corresponding to the vibration point;
the vibration point has a vibration waveform which is a new sequence composed of differential phases at the vibration point in a differential phase curve.

* * * * *